US010810216B2

(12) United States Patent
Mathur et al.

(10) Patent No.: US 10,810,216 B2
(45) Date of Patent: Oct. 20, 2020

(54) DATA RELEVANCY ANALYSIS FOR BIG DATA ANALYTICS (71) Applicant: SAP SE, Walldorf (DE)

(72) Inventors: Suchit Mathur, Bangalore (IN); Indu Venugopal, Bangalore (IN)

(73) Assignee: SAP SE, Walldorf (DE)

(*) Notice: Subject to any disclaimer, the term of this patent is extended or adjusted under 35 U.S.C. 154(b) by 248 days.

(21) Appl. No.: 15/926,284

(22) Filed: Mar. 20, 2018

(65) Prior Publication Data

US 2019/0294689 A1 Sep. 26, 2019

(51) Int. Cl.
G06F 7/00 (2006.01)
G06F 16/2457 (2019.01)
G06F 16/23 (2019.01)
G06F 16/215 (2019.01)
G06F 16/22 (2019.01)

(52) U.S. Cl.
CPC ...... G06F 16/24578 (2019.01); G06F 16/215 (2019.01); G06F 16/2228 (2019.01); G06F 16/2282 (2019.01); G06F 16/23 (2019.01)

(58) Field of Classification Search
CPC ...... G06F 16/221; G06F 16/278; G06F 16/21; G06F 16/215; G06F 16/9024; G06F 16/256; G06F 16/2264
See application file for complete search history.

(56) References Cited

U.S. PATENT DOCUMENTS

| 7,860,902 | B2* | 12/2010 | Brendle | G06F 16/252 707/809 |
| 8,498,954 | B2* | 7/2013 | Malov | G06Q 30/0201 706/45 |
| 8,977,600 | B2 | 3/2015 | Crupi et al. | |
| 9,177,019 | B2* | 11/2015 | Aurin | G06F 16/2453 |
| 9,342,566 | B2* | 5/2016 | Reddy | G06F 16/248 |
| 9,477,745 | B2 | 10/2016 | Tyercha et al. | |
| 9,686,086 | B1 | 6/2017 | Nguyen et al. | |
| 2006/0190310 | A1* | 8/2006 | Gudla | G06Q 10/04 705/7.11 |
| 2010/0169067 | A1* | 7/2010 | Basel | G06F 13/10 703/21 |
| 2014/0096085 | A1* | 4/2014 | Adam | G06T 11/206 715/846 |
| 2014/0201194 | A1* | 7/2014 | Reddy | G06F 16/248 707/722 |

(Continued)

Primary Examiner — Daniel A Kuddus
(74) Attorney, Agent, or Firm — Fish & Richardson P.C.

(57) ABSTRACT

The present disclosure involves analyzing data relevancy of particular fields within one or more databases in a big data system. In one example method, an interaction with at least one of a plurality of monitored data sources is identified, wherein the identified interactions is associated with a particular field of a database table of one of the monitored data sources. A set of data associated with the interaction is determined which includes an identification of each field associated with the identified interaction and a count of a number of interactions associated with each particular field. A relevancy index table is updated to include the determined set of data, wherein each identified field is associated with a row in the index table. At least one relevancy rule is identified for the relevancy index table and is executed to generate a relevancy score for at least one of the fields.

18 Claims, 4 Drawing Sheets (56) References Cited

U.S. PATENT DOCUMENTS

| | | | |
|---|---|---|---|
| 2014/0258212 A1* | 9/2014 | Kunert | G06F 16/2455 |
| | | | 707/607 |
| 2015/0066987 A1* | 3/2015 | Nelke | G06F 16/21 |
| | | | 707/781 |
| 2015/0081718 A1* | 3/2015 | Schmidt | G06F 16/31 |
| | | | 707/741 |
| 2015/0379056 A1* | 12/2015 | Bolik | G06F 16/1744 |
| | | | 707/693 |
| 2016/0373476 A1 | 12/2016 | Dell'anno et al. | |
| 2017/0103267 A1 | 4/2017 | Mishra et al. | |
| 2017/0177633 A1* | 6/2017 | Wenzler | G06F 16/2237 |
| 2017/0192974 A1* | 7/2017 | Kumar | G06F 16/24578 |
| 2018/0316571 A1* | 11/2018 | Andrade | H04L 67/22 |

* cited by examiner

| Field | Table | Hits | LastUpdate | Relevancy Points |
|---|---|---|---|---|
| fld_InvCredits | TBL_SalesTxn | 100 | 7/6/18 12:00 AM | 3 |
| fld_BillOfMaterial | TBL_SalesTxn | 100 | 7/5/18 12:00 AM | 3 |
| fld_POValue | TBL_SalesTxn | 200 | 8/7/18 12:00 AM | 5 |
| fld_PODate | TBL_SalesTxn | 75 | 7/7/18 12:00 AM | 2 |
| fld_QuotValue | TBL_SalesTxn | 175 | 10/1/18 12:00 AM | 4 |
| fld_QuotDate | TBL_SalesTxn | 50 | 5/6/18 12:00 AM | 1 |
| fld_TotalDiscounts | TBL_SalesTxn | 250 | 8/7/18 12:00 AM | 6 |
| fld_Model | TBL_Goods | 300 | 9/1/18 12:00 AM | 7 |
| fld_Make | TBL_Goods | 300 | 9/1/18 12:00 AM | 7 |
| fld_Region | TBL_Goods | 600 | 9/3/18 12:00 AM | 8 |

FIG. 4

DATA RELEVANCY ANALYSIS FOR BIG DATA ANALYTICS

BACKGROUND

The present disclosure relates to a system and computerized method for analyzing and quantifying data relevancy of particular fields and tables within one or more databases in a big data system.

Big data refers to data sets that may be so large and complex that traditional data processing applications and analyses are inadequate. Challenges in big data systems can include, among others, capturing data, data storage, data analysis, search, sharing and visualization, among others. In many cases, big data may refer to or be used with predictive analytics, where value is attempted to be extracted from the large data sets. Big data sets can include structured and unstructured data.

SUMMARY

Implementations of the present disclosure are generally directed to analyzing and quantifying data relevancy of particular fields and tables within one or more databases. In one example implementation, a computerized method executed by hardware processors can be performed. The example method can comprise identifying at least one interaction with at least one of a plurality of monitored data sources, wherein each of the at least one identified interactions is associated with a particular field of a database table associated with the particular one of the monitored data sources. A set of data associated with the at least one identified interaction is determined, where the determined set of data includes an identification of each field associated with the at least one identified interactions and a count of a number of interactions associated with each particular field. A relevancy index table is updated to include the determined set of data associated with the identified fields, wherein each identified field is associated with a row in the relevancy index table. At least one relevancy rule to be evaluated for the relevancy index table is identified. The at least one identified relevancy rule is executed on the relevancy index table, wherein executing the at least one identified relevancy rule comprises generating a relevancy score for at least one of the fields in the relevancy index table.

Implementations can optionally include one or more of the following features. In some instances, each row in the relevancy index table associated with an identified field includes a timestamp identifying a last accessed time associated with the most recent identified interaction. In some of those instances, updating the relevancy index table to include the determined set of data associated with the identified fields can include, for each identified field, determining whether an existing row in the relevancy index table includes an existing set of data associated with the particular identified field. In response to determining that an existing row in the relevancy index table is associated with the particular identified field, the count of the number of interactions associated with the particular field in the determined set of data is added to the existing set of data associated with the particular identified field, and the timestamp identifying the last accessed time associated with most recent identified interaction is updated to a last accessed time from the determined set of data associated with the at least one identified interaction. In some of those instances, updating the relevancy index table to include the determined set of data associated with the identified fields includes, for each identified field, in response to determining that no existing row in the relevancy index table is associated with the particular identified field, inserting a new row into the relevancy index table associated with the particular identified field. Inserting can include setting the count of the number of interactions associated with the particular field to the count of the number of the at least one identified interactions associated with the particular field in the determined set of data and setting the timestamp identifying the last accessed time associated with most recent identified interaction to a last accessed time from the determined set of data associated with the at least one identified interaction.

In some instances, generating the relevancy score for at least one of the fields in the relevancy index table comprises updating an existing relevancy score for the at least one of the fields in the relevancy index table based on the updates to the relevancy index table after the inclusion of the determined set of data.

In some instances, the at least one identified relevancy rule is based on a relative comparison of a number of identified interactions for different fields in the relevancy index table within a threshold time period. In some of those instances, the at least one identified relevancy rule is configured by an administrator.

In some instances, the example method may further include identifying at least one relevancy table cleanup rule associated with the relevancy index table, wherein the at least one identified relevancy table cleanup rule defines at least one criteria for removing rows from the relevancy index table. For each of the rows in the relevancy index table, a determination is made as to whether the at least one criteria for removing rows from the relevancy index table is satisfied. In response to determining that the at least one criteria for removing rows from the relevancy index table is satisfied for a particular row, the particular row is removed from the relevancy index table.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Data sets for many applications and operations are consistently becoming larger and larger as entities and individuals begin to attempt to extract value from the collected data. Systems and hardware have been developed that are used to receive and process the incoming data, however, systems providing analytics and future predications based on the incoming data have seen low performance due to the large size of data used by the underlying applications and the fact that particular portions of the data may not be relevant in a current scenario or context. The present disclosure provides solutions for analyzing incoming and/or historical data from these large, big data data sets, and allow for an identification of relevant tables and fields within those tables. The relevancy analysis can then be used by analytical systems to perform accurate analytics on relevant information and gain proper insights in response.

In one solution, the identification of the relevant fields can be achieved by leveraging, for instance, the processing power of in-memory databases such as SAP's HANA, along with machine learning (ML) algorithms and built-in procedures and analyses. In-memory database are database management systems that primarily rely on main memory for computer data storage as compared to disk storage mechanisms of traditional database management systems. In-memory databases are faster than those traditional systems by providing significant memory access speed gains, providing simpler internal optimization and analysis algorithms, and executing fewer CPU instructions. With that said, implementations of the present solution may be used in any suitable database, including those without the benefits of the in-memory databases.

To qualify as "relevant" in the described analysis, data is intended to be useful for future analysis and predictions. The described system is able to monitor and identify new data entering the system, which may include one or more database tables into which data is written, updated, deleted, or otherwise interacted with, such as through one or more incoming queries. Further, associated historical data can be available in some systems and used to evaluate particular fields and/or tables as relevant. The frequency of the fields being written to, queried, or otherwise interacted with can be constantly and/or periodically monitored and evaluated to identify a specific number of hits or other interactions, thereby identifying an initial quantity and last updated time for a particular field or entity. The ongoing statistics related to the particular fields and tables hit, as well as the number of hits for particular fields and the date and/or time of a most recent hit, among others, can be stored in a relevancy index table used to manage and identify the most relevant data in the monitored databases. In this way, a raw set of statistics can be managed and stored in the index associated with the interactions as monitored with the one or more data sources and databases.

The relevancy index table can be managed by one or more agents, modules, or applications, and can manage the ongoing list of tables and fields with which interactions have occurred while monitored, or based on historical data analysis. In some instances, such as those illustrated below, the relevant index table may identify, among others, columns for the particular fields interacted with, those fields associated tables, a number of hits to those fields (e.g., a total number of hits, a number of hits over a period of time, etc.), and a date of a last interaction with the field. In some instances, the monitored interactions may identify a new field not currently included in the relevancy index table. In such instances, a new field entry can be inserted into the table, along with a number of times the field was hit during the period associated with the current update, and the timing of the last hit (e.g., the actual time of the last interaction with the field, or, alternatively, the time of the current relevancy index table update in which the field entry was updated with additional hits). Where the particular field is already included in the relevancy index table, the entry for the field can be updated to include the additional monitored hits and the timing of the last monitored hit.

After or during the identification of the table and field/entity interactions and the addition or updating of information within the index table, one or more data relevancy algorithm and/or rules can be executed on the current data relevancy index and the information therein to generate or update a relevancy score or value that can be used for future analytics. The data relevancy algorithms can include any suitable algorithm used to evaluate and score the relative or absolute relevancy of particular fields and tables within the set of monitored databases. In one example data relevancy rule, the relevancy score can be based on the amount of time since the last interaction, an absolute amount of interaction over a predetermined or dynamically determined period of time, and/or any other suitable determination. When the last hit or the number of hits is above a certain threshold or value or within a particular period of time or time range, a relevancy score associated with the particular field being evaluated can be incremented to indicate an increased relevancy. Alternative, where the number of hits is not above a particular threshold, where the time since a last hit exceeds a particular time or date, or where the number of hits within a particular time range is not above a particular threshold, the relevancy score may be decremented to illustrate a relatively lower relevancy. Again, any suitable rules and qualifiers can be applied to the particular rule. In some instances, the rule may be predefined and used without change, while in others, clients, users, administrators, and/or relevant persons or entities may be able to customize the relevancy rule analysis to meet scenario-specific or customer/client-specific needs and/or determinations.

A second example rule may include an analysis and/or consideration of historical data identified by or associated with a particular data source, database, or listening/monitoring component monitoring a particular source to determine if a date and time of the last access was within a predetermined prior period of time (e.g., 3 months in an example context). This second example rule may be executed when the relevancy index table is recently added to a particular set of tables or databases, and where in addition to the current incoming information, the system is able to analyze previously received information. If a determination is made that hits have occurred within the predetermined period, the relevancy table can be updated. If the fields and tables to be added based on the historical analysis are already included in the relevancy index table, then the number of hits can be increased and the corresponding relevancy score can be increased with the addition. Similarly, if no hits within the predetermined period of time are found, or a small number are found, the relevancy score can be lowered according to the additional parameters of the example rule.

In a third example rule, one or more keywords may be manually or automatically identified as particularly relevant or interesting within the current context. In such instances, an analysis of the values within particular fields can be evaluated throughout the various data sources. Fields in which the one or more keywords are found can be added to the relevancy index table. If the last action associated with those fields was the inclusion of the one or more keyword (e.g., an insert or query related to that keyword), then the time and date of that action may be used for the last updated field in the relevancy index table.

Any number of additional rules can be used to generate the relevancy analysis, and the examples above and below are not meant to be exhaustive. Instead, the present disclosure provides a generic solution that can apply any suitable relevancy analysis as provided by a software developer, analytics vendor, customer, administrator, or other suitable person or entity.

In some instances, the rules may also include one or more relevancy index table cleanup rules used to remove low relevancy fields from the index when such fields are no longer determined to be relevant based on their current relevancy score, a period of time below of relevancy threshold value, or based on other factors. The cleanup rules can be applied periodically, in response to the relevancy index table reaching a particular size, in response to requests from administrators or other users, and/or in connection with the execution of one or more relevancy rules, among others. The parameters of particular cleanup rules can be predefined by the software developer, customized by administrators or other persons associated with the customer, or can be based on one or more machine learning algorithms related to the analytics system. By removing rows in the index that are no longer considered relevant, the system ensures that the relevancy index table only includes those fields and tables that are truly relevant, and that can be used by further analytics systems to provide more complete and accurate data. Removing non-relevant rows also ensures that the relevancy index table remains at a manageable size such that the relevancy information is quick and easy to access.

One or more systems can consume the information stored in the relevancy index table, including predictive analytics systems, business intelligence systems, and data cleansing systems, among others. For example, predefined queries can be used by one or more analytics systems to return or identify fields and tables having relevancy scores above a particular value (e.g., by using a WHEREIN or similar query language clause or filter). By providing the relevancy scores and relative rankings in the index, the index can ensure that the relevant fields and tables can be specifically identified and quantified according to the requirements of a particular scenario. In some instances, two or more relevancy index tables may coexist, where a first relevancy index table has a first set of relevancy rules for a first context applied, and where a second relevancy index table has a second set of relevancy rules for a second context applied. In such instances, different types of analytics may be applied where the consideration of relevancy differs between the two. Alternatively, when a single relevancy index table is provided, different analytics systems may apply different threshold cutoffs for entries in the table to determine what relevancy score signifies a relevant field in the particular analytics context in which the system is operating.

Figure 1:
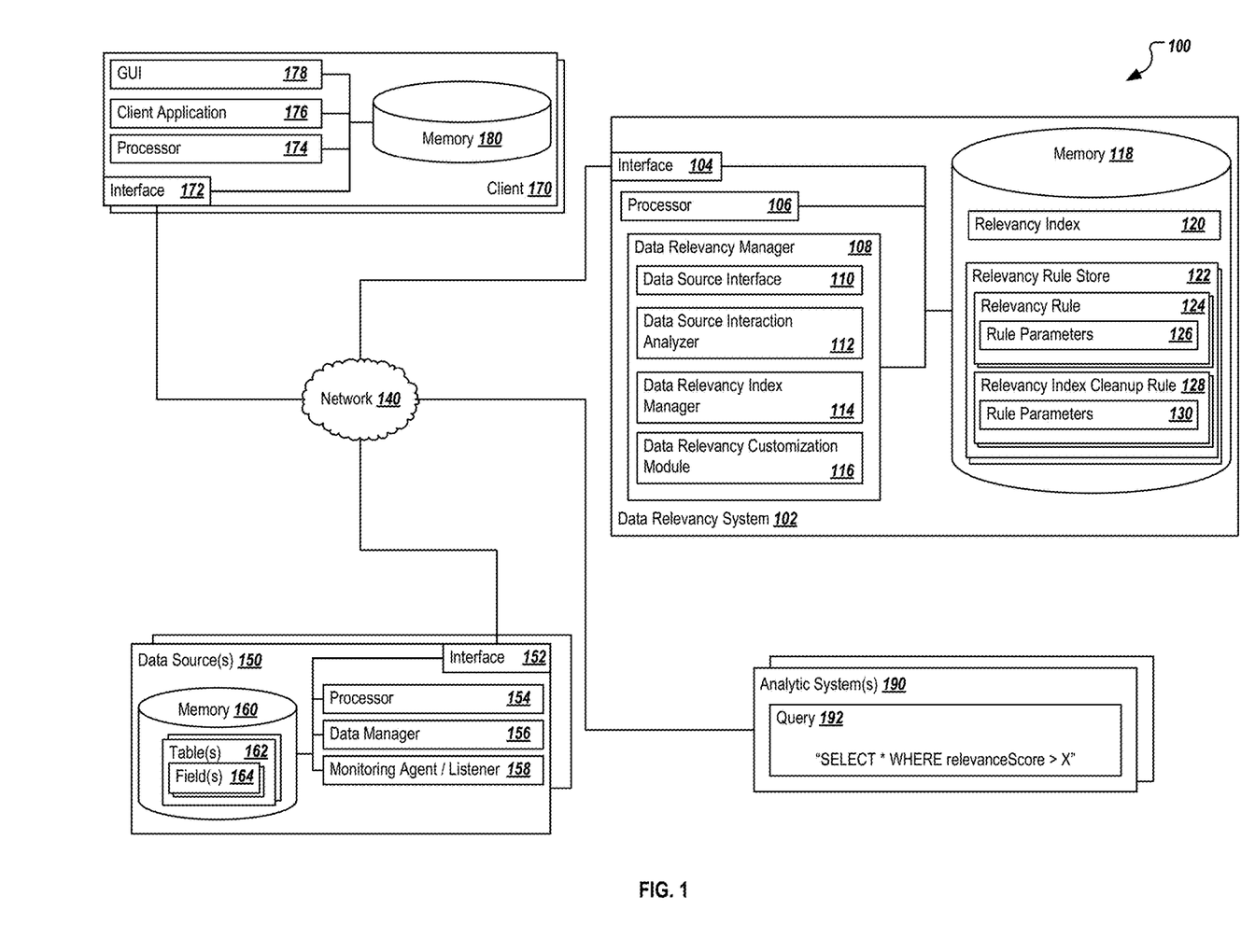
FIG. 1 is a block diagram illustrating an example system for analyzing and quantifying data relevancy of particular fields and tables within one or more databases.

Turning to the illustrated implementation, FIG. 1 is a block diagram illustrating an example system 100 for implementing a system and computerized method for analyzing and quantifying data relevancy of particular fields and tables within one or more databases in a big data system. As illustrated in FIG. 1, system 100 is associated with a data relevancy system 102 for analyzing the relevancy of one or more database fields in a plurality of tables based on one or more relevancy rules or algorithms. The system 100 can allow the illustrated components to share and communicate information across devices and systems (e.g., data relevancy system 102, client(s) 170, data source(s) 150, and analytic system(s) 190, among others, via network 140). In some instances, at least some or all of the components may be cloud-based components or solutions, while in others, non-cloud systems may be used. In some instances, non-cloud-based systems, such as on-premise systems, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, data relevancy system 102, client(s) 170, and the other components may be any computer or processing device such as, for example, a blade server, general-purpose personal computer (PC), Mac®, workstation, UNIX-based workstation, or any other suitable device. Moreover, although FIG. 1 illustrates a single data relevancy system 102, the system 100 can be implemented using a single system or more than those illustrated, as well as computers other than servers, including a server pool. Similarly, any of the other illustrated systems and components may including one or multiple computers or combinations of components. The present disclosure contemplates computers other than general purpose computers, as well as computers without conventional operating systems. Similarly, the client(s) 170 may be any system which can request data and/or interact with the data relevancy system 102, the data source(s) 150, and/or the analytic system(s) 190. Client(s) 170, in some instances, may be or include desktop systems, client terminals, or any other suitable device or other type of computer, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others.

In general, the data relevancy system 102 may be associated with the management, monitoring, and analysis of one or more databases and/or data sources 150, as well as of the interactions of those databases and/or data sources 150. In some instances, the data relevancy system 102 may be associated with or can execute an enterprise application, including but not limited to an enterprise resource planning (ERP) system, a customer relationship management (CRM) system, a supplier relationship management (SRM) system, a supply chain management (SCM) system, a product lifecycle management (PLM) system, or any other suitable system, including large scale big data systems associated with receiving sensor data from one or more Internet of Things (IoT) devices, transaction data associated with financial institutions, search query information associated with one or more search engines, business data associated with one or more enterprises, or any other suitable data and information. In some instances, the data relevancy system 102 may be associated with or a part of such systems, such as when the data relevancy system 102 is a component of an end-to-end enterprise application or portions thereof. Generally, the data relevancy system 102 may also be associated with or executed at a particular data source 150, or alternatively at one or more analytic systems 190.

As illustrated, the data relevancy system 102 is associated with one or more data relevancy rules 124 used to analyze and determine the relevancy of particular fields and tables (e.g., located at the one or more data sources 150) as monitored by the data relevancy system 102. The data relevancy system 102 can identify, register, or otherwise be associated with particular data sources 150 and/or particular databases and/or table for monitoring. In some instances, a monitoring agent or listener 158 may be associated with each data source 150 (or portion of the data source 150) being monitoring by the data relevancy system 102. The monitoring agent or listener 158 may be a remote agent or part of a data relevancy manager 108 executed by the data relevancy system 102, or it may be a reporting mechanism or component associated with a particular data source 150 that can report or provide information about captured or monitored interactions. For example, existing application programming interfaces (APIs) available in one or more of the data sources 150 may be used to identify the interactions and report back to the relevancy index with the relevant information. In some instances, where more than two data sources 150 are monitored, a combination of different agents, reporting components, monitoring systems, and/or other means for collecting such information can be provided or used.

In general, the monitoring process can be used to obtain information identifying particular interactions performed with a monitored data source. Those interactions can include one or more of a query directed to or associated with a particular field in a monitored table or database, a write operation associated with a particular field, a read operation associated with a particular field, an update or modification associated with a particular field, and/or any other suitable interaction. Other interactions that may be captured or monitored by the process include any data manipulation activities on or associated with the table, including changes or manipulations of the data and table structure, including changes such as the addition or removal of fields and/or columns. In addition to specific information identifying the field and table associated with the interaction, a time and date of the interaction may be received. Additionally, if more than one interaction has occurred, the number of interactions, or hits, can be included in the reporting information. In some instances, a report may be provided after each interaction, while in other instances reports may be provided back to the data relevancy system 102 at certain periodic or non-periodic intervals, in response to user requests, or based on one or more events and/or system or monitoring agent 158 determinations. Information can be returned to the data relevancy manager 108 via the data source interface 110, which may be an API available to external systems or another interface allowing interaction information to be received and included in the relevancy index 120, as appropriate.

In general, the data relevancy manager 108 manages the data relevancy collection and evaluation process associated with one or more sets of databases. In some instances, the data relevancy manager 108 may monitor different sets of data using different relevancy rules 124. For example, the data relevancy manager 108 may monitor a first set of databases and their tables for a first user, while the data relevancy manager 108 monitors a second set of databases and their tables (or a portion thereof) for a second user. The first and second sets of databases and tables may differ based on the users and their needs. For example, an enterprise may be associated with both manufacturing and sales. The first group of users may be interested in the data relevancy of large data sets generated by a manufacturing plant, which could include one or more tools, components, supplies, and their related processes, where data is collected on those actions in a first set of databases and tables. The second group of users may be interested in sales information related to the products and services provided, such that their data relevancy analysis may only be related to sales and quote-related databases and tables. The number of data relevancy analyses managed by the data relevancy manager 108 (or plural instances thereof) is flexible, and is not meant to be limited by this description.

The illustrated data relevancy manager 108 further includes a data source interaction analyzer 112, a data relevancy index manager 114, and a data relevancy customization module 116. While illustrated as having these specific components, the data relevancy manager 108 can be implemented to include one or more components that perform some, all, or additional operations including those described herein. In this example, the data source interaction analyzer 112 can perform operations to parse information received from the monitoring agent or listener 158 and count the field and table names that are associated with monitored interactions. In some instances, these operations may include aggregating the data received from two or more data sources associated with the current relevancy analysis, formatting or modifying the incoming interaction information, adding additional data and information to the incoming interaction information (e.g., a time of receipt as the last updated time if not included with the original data set), among others. In some instances, the data source interaction analyzer 112 may include or be composed of one or more APIs, built-in procedures, macros, or other applications associated with or analyzing the data interactions associated with the tables 162 and fields 164 of various data sources 150. In some instances, the data sources 150 themselves, or a portion thereof, may include one or more local processes, APIs, and/or other procedures or operations that allow the data to be parsed, such that the data source interaction analysis can be performed remote from the illustrated data relevancy system 102, where information and results from those analyses are reported back to the data relevancy system 102.

As illustrated, the data relevancy system 102 and the data relevancy manager 108 include or are associated with the data relevancy index manager 114, where the data relevancy index manager 114 performs operations associated with updating statistics and values included in the relevancy index 120 based on the analyses performed by or provided to the data source interaction analyzer 112. The data relevancy index manager 114 can also execute one or more of the relevancy rules 124 and/or the relevancy index cleanup rules 128 to manage the relevancy index 120 and its contents. In one instances, the data relevancy index manager 114 can receive information about the monitored or identified data interactions with particular fields 164 of particular tables 162 of one or more data sources 150. Based on the received or identified information, the data relevancy index manager 114 can update entries in the data relevancy index 120 to include up-to-date or periodically updated information as it is received, or in batches over time.

Different operations may be performed by the data relevancy index manager 114 based on whether a new field not previously included in the index 120 is interacted with versus an existing field. Initially, the data relevancy index manager 114 may determine whether or not a particular field associated with recent activity has already been included in the existing index 120. In some instances, where dormant entries in the index 120 are removed according to the relevancy index cleanup rules 128, the determination may be whether the particular field is currently included in the index. If the field is already included based on the determination, information associated with that field can be updated. For example, a number of hits or interactions associated with the field can be updated and the time of the last update and/or interaction can be updated to match the latest interaction and/or update to the index 120. If the field is not already included in the index 120, the data relevancy index manager 114 can add a new entry into the relevancy index 120 by adding a new row to the index 120, adding the particular field associated with the interaction, the table in which that field exists, the number of interactions being added, and the time of the last interaction and/or index 120 update.

Once the captured and/or monitored information related to the field interactions at the various data sources 150 has been added to the index 120, the data relevancy index manager 114 can execute the one or more relevancy score rules 124 to be applied to particular contexts or implementations of the described system. The particular rules 124 applied, as well as the parameters 126 associated with those rules, can be based on a default set of rules and/or a customized set of rules. For example, a basic set of relevancy rules may be supplied by a developer or rule provider. However, the system may include the ability to customize data relevancy rules 124 manually by administrators, end users, and others, or by applying one or more machine learning-based relevancy rules to historical and received data. The data relevancy customization module 116 can provide tools, interfaces, and predefined filters and templates for defining new rules and modifying existing ones. Additionally, parameters 126 associated with particular existing rules can be modified or tweaked to modify the performance of the corresponding relevancy rule(s) 124, as well as the cleanup rules 128 and their associated parameter 130.

The relevancy rules 124 can be applied by the data relevancy index manager 114 at any suitable time, including after each update to the relevancy index 120, after a certain number of updates to the relevancy index 120, at periodic intervals (e.g., after 100 milliseconds, after 5 seconds, after 5 minutes, after an hour, after a day, etc.), in response to a manually-initiated request to run one or more of the relevancy rules 124, or in response to an event associated with the relevancy index 120 and/or one or more of the data sources 150, as well as in response to any other suitable initiating event. The relevancy rules 124 may be applied in a certain order, or they may be applied separately or without a specific order. The order may be based on a priority level of particular rules as expressly or impliedly included within or associated with the particular relevancy rules 124, the type of rule, or on any other criteria or factors.

Example relevancy rules 124 may be based on any suitable criteria, and may be generic and apply to all fields and tables, or may be specific to particular fields and/or tables, in some instances. In a first example, a first relevancy rule 124 may identify a particular time at which a most recent interaction or set of interactions occurred in relation to multiple fields. Based on one or more parameters 126, the relevancy rule 124 can instruct the data relevancy index manager 114 how to provide a particular score or value to the particular field entry. In one instance, the first rule 124 may cause the relevancy score or point value to increase in response to additional interactions being detected during a recent period or over a certain amount of time. In some instances, a raw number of interactions over a period of time may be evaluated. In others, a relative number of interactions over a period of time for one field may be compared to or evaluated against or in comparison to one or more other fields to determine a score. In some instances, a particular range or quantity of a number of interactions may need to be met during a period of time in order to maintain a current relevancy value. If the number of interactions is higher than the particular threshold, the relevancy score can be incremented by one or more points (e.g., where the relevancy score is, for example, on a 0-10 scale, although any suitable scale can be used). Similarly, if below a particular threshold or number of interactions are identified, then the relevancy score can be decremented. Significant interactions above or below the various ranges and/or thresholds may cause multiple point increases or decreases, respectively, with such changes and evaluations being defined within the relevancy rule 124 being evaluated.

In a second example relevancy rule 124, historical data of a particular data source 150 may be accessed and evaluated to determine a last access or interaction with a particular field. For example, if a particular field was accessed within the last three (3) months, then the field may be added to the relevancy index 120. If the field has been interacted with more recently, the score or relevancy value for that particular field may be increased or otherwise set to a particular value. In some instances, rules such as the first and second rules can be combined. In this instance, the time of last interaction may be combined with the amount of interactions of a period of time. For significant amounts of interaction over the time period in addition to a very recent last interaction, the relevancy score for the value can be increased by more than 1, again considering a simple 0-10 or other small range scale.

In a third example, a descriptive string or value can be associated with a relevancy rule. For example, a particular keyword may be determined to be relevant to a particular business, entity, or person. The relevancy rule 124 in this instance can be used to evaluate whether the interactions associated with the particular data source 150 include, are associated with, insert, modify, or return a particular value to match or be related to the keyword identified by the rule. If so, the relevancy rule 124 may increase a particular field's relevancy score or value based on the relationship to the identified particular keyword.

As noted, some or all of the relevancy rules 124 can be modified or customized in various implementations, and can allow the particular parameters 126 of a rule to be modified according to any suitable criteria, individual decision, or machine learning/AI-based evaluation of existing data and known trends or relevancies.

In addition to evaluating the relevancy rules 124, the data relevancy index manager 114 can be associated with and execute one or more relevancy index cleanup rules 128. The relevancy index cleanup rules 128 can be used to remove particular fields from the relevancy index 120 after the criteria or parameters 130 of the cleanup rules 128 are met or otherwise satisfied. For example, if, due to a period of inactivity associated with a particular field that was previously added to the index 120, the score associated with the particular field has dropped to a 0, 1, or another relatively low number (based on the parameters 130 as defined, such as a cleanup threshold), the cleanup rule 128 may determine the field to no longer be relevant. In such instances, the data relevancy index manager 114 can remove those fields from the index 120 to ensure that data determined not to be relevant. The cleanup rules 128 may be based on any particular parameters 130. In some instances, a particular rule 128 may determine (1) whether the score or value associated with any fields in the index 120 are below a threshold value (e.g., below 2 on a 0-10 scale), and (2)

whether that field has been below the threshold value for a particular amount of time (e.g., for over 3 months). If both requirements are met, then the cleanup rule 128 can determine a particular field should be removed, and the data relevancy index manager 114 can perform the cleanup. Any other suitable number and types of cleanup rules 128 may be used in alternative implementations, and may be based on any suitable criteria. In some instances, the time since a last interaction or update may determine whether a particular field should be removed. In other instances, a number of interactions over a period of time below a threshold number, without consideration for the current relevancy value or score, may be associated with a cleanup rule 128. In some instances, only information included in the relevancy index 120 may be considered for cleanup, while in other instances, historical information associated with prior interactions may also be included in the determination and evaluation of the rule 128.

Returning generally to the data relevancy system 102, the data relevancy system 102 includes interface 104, at least one processor 106, the data relevancy manager 108 (described above), and memory 118. The interface 104 is used by the data relevancy system 102 for communicating with other systems and components in a distributed environment—including within the environment 100—connected to the network 140, e.g., one or more clients 170, the data sources 150, the analytic systems 190, as well as other systems communicably coupled to the data relevancy system 102 and/or network 140. Generally, the interface 104 comprises logic encoded in software and/or hardware in a suitable combination and operable to communicate with the network 140 and other components. More specifically, the interface 104 may comprise software supporting one or more communication protocols associated with communications such that the network 140 and/or interface's hardware is operable to communicate physical signals within and outside of the illustrated environment 100. Still further, the interface 104 may allow the data relevancy system 102 to communicate with one or more clients 170 regarding customization of one or more data relevancy rules 124 or cleanup rules 128, with one or more data sources 150 for monitoring and collection of data of one or more relevant fields and tables, and with the analytic systems 190 to provide analytics, information, and filters on fields 164 of particular relevance as determined by the processes described in the present disclosure.

Network 140 facilitates wireless or wireline communications between the components of the environment 100 (e.g., between the data relevancy system 102 and a particular client 170, the data sources 150, and/or the analytic systems 190, among others), as well as with any other local or remote computer, such as additional mobile devices, clients, servers, databases, data sources, and/or other devices or components communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the data relevancy system 102) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The data relevancy system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the data relevancy system 102, in particular those related to the data relevancy manager 108 and related operations and tasks. Specifically, the processor 106 executes the algorithms and operations described in the illustrated figures, as well as the various software modules and functionality, including the functionality for sending communications to and receiving transmissions from the various illustrated components and systems of FIG. 1. Each processor 106 may have a single or multiple core, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Memory 118 of the data relevancy system 102 may represent a single memory or multiple memories. The memory 118 may include any memory or database module and may take the form of volatile or non-volatile memory including, without limitation, magnetic media, optical media, random access memory (RAM), read-only memory (ROM), removable media, or any other suitable local or remote memory component. The memory 118 may store various objects or data (e.g., the relevancy index 120, the relevancy rule store 122 storing the relevancy rules 122 and the cleanup rules 128, as well as others, etc.), including financial data, user information, administrative settings, password information, caches, applications, backup data, repositories storing business and/or dynamic information, and any other appropriate information associated with the data relevancy system 102, including any parameters, variables, algorithms, instructions, rules, constraints, or references thereto. Additionally, the memory 118 may store any other appropriate data, such as VPN applications, firmware logs and policies, firewall policies, a security or access log, print or other reporting files, as well as others. While illustrated within the data relevancy system 102, some or all of memory 118 may be located remote from the data relevancy system 102 in some instances, including as a cloud application or repository, or as a separate cloud application or repository when the data relevancy system 102 itself is a cloud-based system. In some instances, particularly in enterprise systems, the relevancy index 120 may be stored in a centralized repository to allow access to various applications and components in an end-to-end system, in particular those of the analytic systems 190. Similarly, some or all of the rules 124, 128 in the rule store 122 may be stored separately, in some instances, including locally at a particular client 170 or at one or more of the data sources 150. With that said, the data relevancy system 102 and its operations may, in some instances, be able to access any and all relevant data via internal connections and/or through connections to network 140, where appropriate.

As illustrated and described, one or more clients 170 may be present in the example system 100. In some instances, different clients 170 may be associated with different types of users. For example, a first client 170 may be associated with an administrator, or some other user able to create and/or modify one or more relevancy rules 124 or cleanup rules 128, as well as to define the connections and data sources 150 connected to and/or monitored by the data relevancy manager 108, as well as other administrative or power user tasks or operations. In some instances, a plurality of rules 124, 128 may be available within the rule store 122, where the first client 170 is able to choose or select particular rules 124, 128 to be applied in a particular context or for a particular solution. A second client 170, on the other hand, may be associated with end users interacting with the data relevancy system 102 to, for example, review a current relevancy index 120, including identifying or determining trending fields 164 and tables 162. In some instances, end users may also have a limited or partial ability to modify parameters 126, 130 associated with rules 124, 128, respectively, or otherwise modify the operation of particular rules and the execution of the data relevancy manager 108. Users of the clients 170 may interact with the data relevancy system 102, or other illustrated systems, through a client application 176.

Each client 170 may be associated with requests transmitted to the data relevancy system 102 and other components via the client application 176 executing on or at the client 170. In some instances, different applications 176 or tools may be available for different systems, or for different users or types of users. As illustrated, the clients 170 may include an interface 172 for communication (similar to or different from interface 104), at least one processor 174 (similar to or different from processor 106), the client application 176, memory 180 (similar to or different from memory 118), and a graphical user interface (GUI) 178.

The illustrated clients 170 are intended to encompass any computing device such as a desktop computer, laptop/notebook computer, mobile device, smartphone, personal data assistant (PDA), tablet computing device, one or more processors within these devices, or any other suitable processing device. In general, the clients 170 and their components may be adapted to execute any operating system, including Linux, UNIX, Windows, Mac OS®, Java™, Android™, or iOS. In some instances, the clients 170 may comprise a computer that includes an input device, such as a keypad, touch screen, or other device(s) that can interact with the client application 176, and an output device that conveys information associated with the operation of the applications and their application windows to the user of the clients 170. Such information may include digital data, visual information, or a GUI 178, as shown with respect to the client 170. Specifically, the client 170 may be any computing device operable to communicate queries or communications to the data relevancy system 102, other clients 170, and/or other components via network 140, as well as with the network 140 itself, using a wireline or wireless connection. In general, clients 170 each comprise an electronic computer device operable to receive, transmit, process, and store any appropriate data associated with the environment 100 of FIG. 1. In some instances, different clients 170 may be the same or different types or classes of computing devices. For example, at least one of clients 170 may be associated with a mobile device (e.g., a tablet), while at least one of the clients 170 may be associated with a desktop or laptop computing system. Any combination of device types may be used, where appropriate.

Client application 176 may be any suitable application, program, mobile app, or other components. As illustrated, the client application 176 can interact with the data relevancy system 102 to perform client-side operations associated with a particular data relevancy system 102 and its components (e.g., the data relevancy manager 108) via network 140. In some instances, the client application 176 may be a browser, where the functionality of the client application 176 may be realized using a web application or website the user can interact with via the client application 176. In other instances, the client application 176 may be a remote agent, component, or client-side version of the data relevancy system 102 and/or one or more of the other illustrated components. In some instances, the client application 176 may interact directly with the data relevancy system 102.

GUI 178 of client 170 can interface with at least a portion of the environment 100 for any suitable purpose, including generating a visual representation of the client application 176 and/or the content associated with the client application 176, as well as visual representations of the data relevancy index 120 or other portions or operations of the data relevancy system 102, as well as the other illustrated components. In particular, the GUI 178 may be used to present screens or UIs associated with the client applications 176 or data relevancy system 102. The GUI 178 may also be used to view and interact with various Web pages, applications, and Web services located local or external to the client 170. Generally, the GUI 178 provides the users with an efficient and user-friendly presentation of data provided by or communicated within the system. The GUI 178 may comprise a plurality of customizable frames or views having interactive fields, pull-down lists, and buttons operated by the user. For example, the GUI 178 may provide interactive elements that allow a user to view or interact with information related to the operations of processes associated with the data relevancy system 102, including the presentation of and interaction with particular application and relevancy rule data associated with the client application 176 and the data relevancy manager 108, and/or the restriction rule definition module 108, among others. In general, the GUI 178 are often configurable, supports a combination of tables and graphs (bar, line, pie, status dials, etc.), and are able to build real-time portals, application windows, and presentations. Therefore, GUI 178 contemplates any suitable graphical user interface, such as a combination of a generic web browser, a web-enable application, intelligent engine, and command line interface (CLI) that processes information in the platform and efficiently presents the results to the user visually.

Data sources 150, as described, can be any data source, including a database, search engine, etc., associated with incoming interactions performed by one or more systems or users, and can be associated with one or more database tables 162, each table 162 having one or more fields 164 available for interaction. In some instances, the interactions associated with each of the fields 164 and tables 164 may represent queries to the tables 162 and their associated fields 164, or alternatively additions, deletions, or modifications to the fields 164 themselves through inserts, updates, and other related actions. In some instances, some interactions may be manual requests received from users, while in others, interactions may be related to operations performed by an automated system. For example, one data source 150 may be associated with a factory, where the tables 162 and fields 164 are related to sensor and other inputs associated with one or more machines and operations performed within the factory. In other instances, a second data source 150 may be associated with financial systems for an online retailer, where the tables 162 and fields 164 including information on products, product sales, searches for or associated with those products, and sales information associated therewith. The data sources 150 may be related to a particular context (e.g., sales information), or may include databases associated with a plurality of contexts. In those instances, the data relevancy manager 108 may be associated with multiple relevancy indices 120, where each index 120 is associated with a particular relevancy context. Alternatively, each data relevancy system 102 may be associated with a single context, in some instances.

For example purposes, each data source 150 includes or is associated with an interface 152 (similar to or different from interface 104), at least one processor 154 (similar to or different from processor 106), a data manager 156, one or more monitoring agents or listeners 158 (as previously described), and memory 160, which may be a database, a plurality of databases, or a portion of one or more databases or other data repositories. The data manager 156 may be any software or system that manages the data source 150 and interactions associated with the data source 150, including incoming requests, corresponding responses, and the modification of data within the data source 150 based on those responses, including the addition or deletion of data. The data manager 156 can be a database management system (DBMS) in some instances, or another type of software managing the data. In some instances, the data manager 156 can be a DBMS comprising software designed to define, manipulate, retrieve and manage data in a database, such as in tables 162 and fields 164. The DBMS can generally manipulates the data itself, the data format, field names, record structure and file structure. The DBMS can also define rules to validate and manipulate the underlying data and structure. The data manager may be able to interpret and interact with one or more query languages, such as SQL, among others. In some instances, the tables 162 and fields 164 may be included in any suitable format, including a relational database, a flat database, an object-oriented database, or a hierarchical database, among others. In some instances, the data manager 156 may be or include an in-memory database, such as SAP's HANA database and products. In contrast to DBMSs that use a disk storage mechanism, in-memory database tables can be stored on and executed in main memory to increase disk access speeds and internal optimization algorithms. In some instances, different data sources 150 may represent different systems with different storage mechanisms and/or techniques. To access the information for the data relevancy analysis, the monitoring agent or listeners 158 can be installed at each data source 150 to monitor and report back to the data relevancy manager 108 information about particular interactions. In some instances, the monitoring agent 158 may be a component or agent of the data relevancy system 102, while in others it may be a component of agent of the data source 150 or a related system, where the agent 158 is configured to report or provide information to the data relevancy system 102. In some instances, a data source 150 may also represent a single database or a single table within a particular database, as well as a view on a particular table 162, set of tables 162, or set of databases. In some instances, the data source 150 may be a data warehouse, a non-database storage system or file, or any other suitable location.

As illustrated, one or more analytic systems 190 can be associated with the system 100, and can use the information in the relevancy index 120 to modify and/or enhance analytical evaluations being performed. In some instances, the data relevancy system 102 may be a part of or related to one or more analytic systems 190, wherein the information managed and obtained by the data relevancy system 102 is already available to the analytic system 190. In some instances, the analytic systems 190 may include, or may submit, a query 192 to the data relevancy system 102 for information from the relevancy index 120 as particular analytical queries are being generated at the analytic system 190. As illustrated in FIG. 1, an example query may be represented as "SELECT*WHERE relevanceScore>X", where X is a threshold value for relevance for the particular analytical system 190. The analytical system 190 is requesting a listing of fields within the relevancy index associated with a relevancy score or value that exceeds the defined threshold X. That information can then be used by the analytic system 190 as needed, including by using the returned fields in a further query or analysis. As will be understood, any suitable query from the analytic system 190 can be submitted or used to access the information in the relevancy index 120, and can obtain the relevant information as needed. In addition to a particular relevance score, the query 192 could include requirements for a number of interactions, a last accessed date, or other available information, including limiting the results to particular subsets of tables or fields based on a filter criteria. Any suitable query 192 can be used, as appropriate. In alternative or additional implementations, prediction algorithms can also consume the information generated by and associated with the relevancy analysis in order to provide better and more accurate predictions and presentations of KPIs and related analyses.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
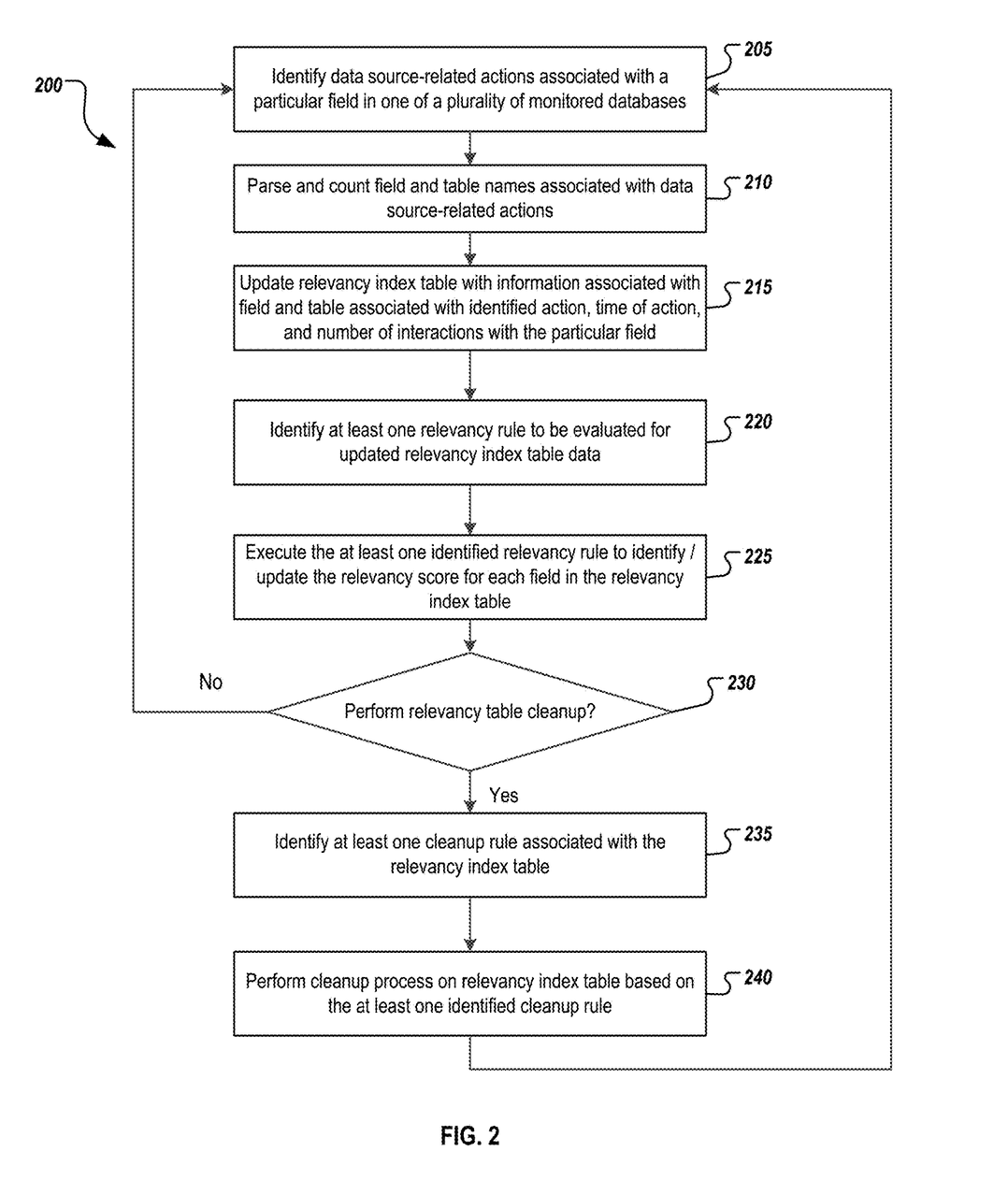
FIG. 2 represents an example flow for analyzing identified interactions with the one or more databases and the operations for maintaining and updating a relevancy index based on the same.

FIG. 2 represents an example flow for analyzing identified interactions with the one or more databases and the operations for maintaining and updating a relevancy index based on the same in one implementation. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

At 205, data source-related actions associated with particular fields in one of a plurality of monitored data sources are identified. A single action, or interaction, may be identified, or multiple interactions may be identified. In some instances, the identification may be associated with or performed by a monitoring agent, application, or API associated with particular data sources. In response to the action or interaction with particular fields at the monitored data source, the monitoring agent, application, or API can immediately send the results to the corresponding data relevancy system (e.g., data relevancy system 102) or the system, component, or application to which the information is reported. In some instances, the monitoring tool or component can collect data over a period of time locally, and then, after a period of time or in response to an event, can then send the aggregated set of results to the system managing the information. In some instances, the collected interactions may be continuously reported or returned to the relevancy system, where the relevancy system can—continuously, periodically, and/or in response to certain triggers or events—update the relevancy index with the information. As described in FIG. 2, the identified actions may be identified by a component of the relevancy system, by a third-party application or monitoring agent, by an API or other components of the data source, or by the data relevancy system itself. The actions and interactions to be detected may be queries directed to certain fields and/or tables, inserts and/or modifications to data within or associated with a particular fields, the deletion of information from and/or associated with particular fields, among others.

At 210, the information on the interactions can be parsed from the reported or monitored collection of information, and the interactions associated with each particular field can be counted and collected. In addition to the particular field, information about the table in which the field exists can be identified, as well as the times of one or more of the interactions. In some instances, only the time of the last interaction may be returned, while in other instances, timing information about more than one of the interactions can also be returned. In some instances, built-in or automatic procedures associated with a database or system managing the underlying relevancy index table can perform the parsing and counting operations, including APIs and other interface operations associated with the receipt of the information from or associated with the one or more monitored databases and/or data sources.

At 215, a relevancy index table associated with the monitored databases and/or data sources is updated based on the collected and analyzed information. In one instance, the relevancy index table can include information including, but not limited to, the field and table name associated with interactions, a count for a number of interactions associated with the particular field, and a time of the last action and/or interaction monitored for that field. Updating the relevancy index table can be performed for each field included in or associated with the identified actions. First, a determination is made as to whether a row or entry for the particular field already exists in the relevancy index table. If the field is already included in a row of the index, then the data associated with the recent monitored interactions can be used to update the values. For instance, the interaction count for the particular field can be increased from its prior value based on the number of monitored interactions. Further, a time associated with the last monitored interaction can be used to update a timestamp of the last access or interaction for the field. In some instances, the timestamp may be generalized or represent the last time the update to the field was made. In others, the collected data may include an indication of the last update or access, allowing the update to directly identify the latest update or modification to the field.

At 220, at least one relevancy rule to be evaluated for the updated relevancy index table data can be identified. In some cases, multiple relevancy rules can be applied to a particular relevancy index table, in combination, sequentially, or separately based on particular triggers, events, or other causes. In other instances, a single rule may be used to determine the relevancy score. As previously described, the relevancy score may be any suitable evaluation of the interaction information in an absolute and/or relative analysis. The rules used to evaluate a set of fields' relevancies can be based on predefined rules, but may also be customized based on the preferences and/or analysis of administrators and entities. Many example rules may be used, and may differ in each implementation. In a first example rule, the since a last access may be used to determine a relevancy score or a portion thereof. For example, one or more thresholds may be considered in the first example rule, such as where after a period of time, if no accesses or interactions have been monitored, the relevancy score for a particular field can be decreased. In response to a new interaction or threshold number of interactions after a period of time, the relevancy score can be increased. In some instances, factors associated with particular values in the monitored fields can be used to analyze and determine the appropriate relevancy score to be applied. For example, the term "bitcoin" may be deemed relevant by an administrator and associated with a relevancy rule. The fields in which values are associated with or are "bitcoin" can be evaluated in such a manner to determine which of the fields are relevant. Any other suitable rules can be applied, and can be evaluated here.

At 230, a determination is made as to whether a relevancy index table cleanup is to be performed. In some instances, the cleanup may be performed after every index update, while in others, additional factors and considerations may be used to determine when the cleanup is needed. While shown after the index has been updated, in some instances, cleanups may be performed at certain intervals and/or after certain periods of time, regardless or unrelated to any incoming monitored interactions. If a cleanup is to be performed, method 200 continues at 235, while if no cleanup is to be performed, then method 200 returns to 205.

At 235, at least one cleanup rule associated with the relevancy index table is identified. Similar to the relevancy rules, any cleanup rules including one or more cleanup criteria can be associated with the relevancy index table, and the rules can be customized to the particular implementations. One example cleanup rule may be used to remove fields that receive occasional interactions, but which fail to become particularly relevant as compared to other more relevant and popular fields. For example, one cleanup rule may evaluate a length of time in which a field has a relevancy score of less than 3 (on a 10 point scale), and, if the length of time exceeds some threshold period of time (e.g., 3 months), then the field may be removed from the index. Other rules may be applied, such as when any rule is associated with a relevancy score of 0 or 1. At 240, the cleanup process is performed on the fields of the relevancy index table based on the at least one identified cleanup rule. If any fields in the relevancy index table satisfy the criteria of those rules, the fields are removed from the table. In some instances, the satisfaction of only a single rule may be required for removal, while in others, the satisfaction or two or more (or all) applied cleanup rules may be required for removal.

Figure 3:
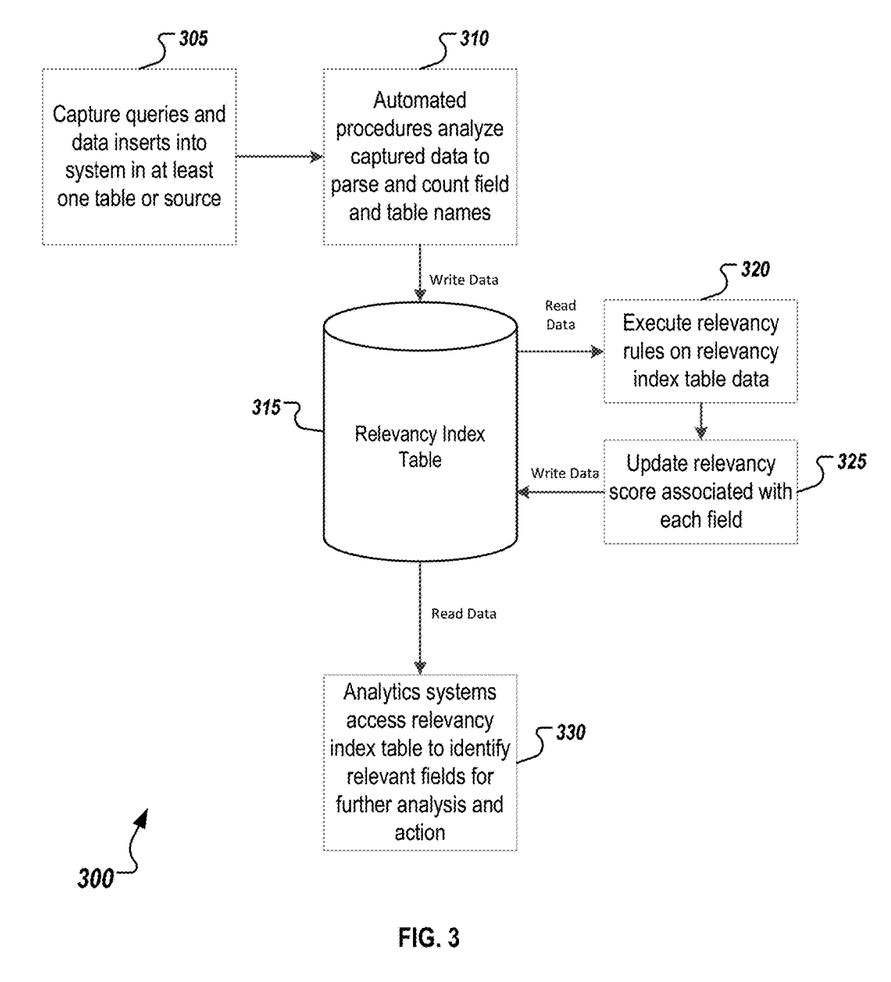
FIG. 3 is an example illustration of a simplified system including the data relevancy analysis.

FIG. 3 is an example illustration of a simplified system 300 including the data relevancy analysis. At 305, queries, data inserts, and other interactions with at least one table or data source are monitored and/or captured. In some instances, only information about those interactions are captured, such as the relevant fields being affected by the interaction. The capture may not include payload or actual information about the action or interaction occurring or being taken, but instead may identify a field interacted with (e.g., queried or updated) and, in some instances, a time of the last access.

At 310, automated procedures are used to analyze the monitored/captured data to parse and count the field names and interactions. The parsing and count can be performed by automated, or built-in procedures, such as in an in-memory database. In doing so, the processing speed and efficiency can be increased, and the data, once obtained, can be automatically and without user input applied to the relevancy index table. In some instances, the captured data can be analyze by one or more APIs provided by the in-memory system and used to perform operations related to the calculations of the interactions performed with particular fields. The calculated data derived from the parsed and counted data can then be written into the relevancy index table 315 as described above.

Once the data is written into the table 315, one or more relevancy rules can be executes or evaluated against the updated relevancy index table data at 320. The rules can read the index table data, determine changes, updates, and/or initial relevancy values to be applied to the index table as described above. Once the relevancy values are analyzed and determined, the relevancy score associated with each field can be updated at 325, where necessary. Some relevancy scores may stay the same, while others can be increased or decreased according to the evaluated relevancy rules. The results of the updated relevancy score analysis can then be written to the relevancy table index 315. In some instances, one or more cleanup rules may also be applied and/or evaluated, further modifying the table 315.

At 330, one or more analytics systems can read or access the relevancy index table 315 to identify one or more determined relevant fields for further analysis and/or action. In some instances, those analytics systems can use the relevance information to determine particular fields to be queried, interacted with, or otherwise used. Analytical results can be used across one or more systems, in some instances.

Figure 4:
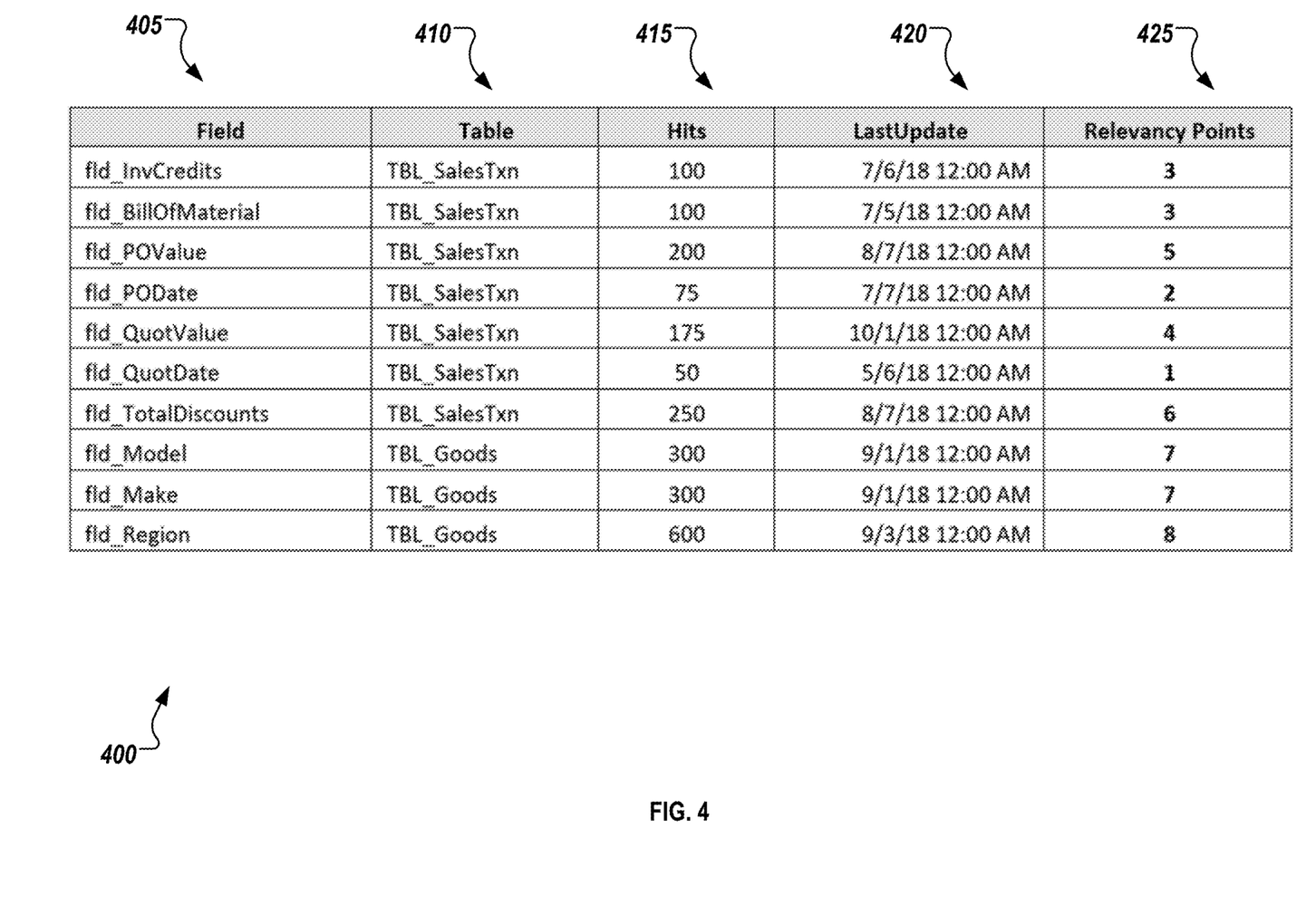
FIG. 4 is an example relevancy index table maintained based on the data relevancy analysis.

FIG. 4 is an example relevancy index table 400 maintained based on the data relevancy analysis. The illustrated example is meant to be an example, and is not meant to be limiting in the structure and/or content of the relevancy index table 400. The illustrated table 400 is an example of a relevancy table built over an extended period of time, and based on a significant number of interactions across a plurality of monitored fields and tables. Five columns are presented in the table 400, including a field column 405, a table column 410, a number of hits or interactions column 415, a date of the last update or access column 420, and a relevancy score column 425. Other columns may be included in other implementations, including additional and/or alternative information.

The field column 405 and table column 410 identify the specific fields interacted with and the tables in which they reside, respectively. The hits column 415 identifies the number of monitored interactions with the corresponding field. In some instances, the hits column 415 may be broken down or separated into historical data and/or recent data, such as a number of interactions within a particular period of time and hits overall. Whether this information is included explicitly in the table, some relevancy rules can use such historical information and recent information to inform and evaluate particular relevancy criteria. The last update column 420 identifies a last interaction with the particular field. The last update can be based on the exact time a last interaction with the field occurs, while in other instances, the last interaction time may be a time when the latest information on recent updates is received. The relevancy score column 425 represents a value that is generated after the evaluation of one or more relevancy rules. Scores for particular fields can be updated over time based on recent and historical interactions. The more numerous and/or more recent interactions are provided a higher relevancy score, or the relevancy scores can be increased. Conversely, the fields with a longer time since the last interaction and/or fewer interactions may be decremented or have their scores lowered. In some instances, one or more cleanup rules can be applied. For example, as relevancy scores go below a particular threshold value or stay below that threshold for a period of time, such fields can be removed from the table 400 according to the corresponding cleanup rules.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method executed by at least one processor, the method comprising:

identifying at least one interaction with at least one of a plurality of monitored data sources, wherein each of the at least one identified interactions is associated with a particular field of a database table associated with the particular one of the monitored data sources;

determining a set of data associated with the at least one identified interaction, where the determined set of data includes an identification of each field associated with the at least one identified interactions and a count of a number of interactions associated with each particular field;

updating a relevancy index table to include the determined set of data associated with the identified fields, wherein each identified field is associated with a row in the relevancy index table;
identifying at least one relevancy rule to be evaluated for the relevancy index table;
executing the at least one identified relevancy rule on the relevancy index table, wherein executing the at least one identified relevancy rule comprises generating relevancy scores for the identified fields in the monitored data sources, wherein the at least one identified relevancy rule is based on a relative comparison of a number of identified interactions for different fields from the plurality of monitored data sources identified in the relevancy index table within a threshold time period; and
in response to evaluating the relevancy index table, identifying relevant data at the plurality of monitored data sources for a particular data analysis context, wherein the relevant data is associated with a set of fields from the field identified in the relevancy index table, wherein the set of fields have a higher relevancy score compared to a threshold value, wherein the set of fields are identified as relevant for the particular data analysis context.

2. The method of claim 1, wherein each row in the relevancy index table associated with an identified field includes a timestamp identifying a last accessed time associated with the most recent identified interaction.

3. The method of claim 2, wherein updating the relevancy index table to include the determined set of data associated with the identified fields includes:
for each identified field:
determining whether an existing row in the relevancy index table includes an existing set of data associated with the particular identified field;
in response to determining that an existing row in the relevancy index table is associated with the particular identified field:
adding the count of the number of interactions associated with the particular field in the determined set of data to the existing set of data associated with the particular identified field; and
updating the timestamp identifying the last accessed time associated with most recent identified interaction to a last accessed time from the determined set of data associated with the at least one identified interaction.

4. The method of claim 3, wherein updating the relevancy index table to include the determined set of data associated with the identified fields includes:
for each identified field:
in response to determining that no existing row in the relevancy index table is associated with the particular identified field, inserting a new row into the relevancy index table associated with the particular identified field, wherein inserting includes:
setting the count of the number of interactions associated with the particular field to the count of the number of the at least one identified interactions associated with the particular field in the determined set of data; and
setting the timestamp identifying the last accessed time associated with most recent identified interaction to a last accessed time from the determined set of data associated with the at least one identified interaction.

5. The method of claim 1, wherein generating the relevancy score for at least one of the fields in the relevancy index table comprises updating an existing relevancy score for the at least one of the fields in the relevancy index table based on the updates to the relevancy index table after the inclusion of the determined set of data.

6. The method of claim 1, wherein the at least one identified relevancy rule is configured by an administrator.

7. The method of claim 1, further comprising:
identifying at least one relevancy table cleanup rule associated with the relevancy index table, wherein the at least one identified relevancy table cleanup rule defines at least one criteria for removing rows from the relevancy index table;
determining, for each of the rows in the relevancy index table, whether the at least one criteria for removing rows from the relevancy index table is satisfied; and
in response to determining that the at least one criteria for removing rows from the relevancy index table is satisfied for a particular row, removing the particular row from the relevancy index table.

8. A non-transitory computer-readable medium storing instructions which, when executed, cause at least one processor to perform operations comprising:
identifying at least one interaction with at least one of a plurality of monitored data sources, wherein each of the at least one identified interactions is associated with a particular field of a database table associated with the particular one of the monitored data sources;
determining a set of data associated with the at least one identified interaction, where the determined set of data includes an identification of each field associated with the at least one identified interactions and a count of a number of interactions associated with each particular field;
updating a relevancy index table to include the determined set of data associated with the identified fields, wherein each identified field is associated with a row in the relevancy index table;
identifying at least one relevancy rule to be evaluated for the relevancy index table;
executing the at least one identified relevancy rule on the relevancy index table, wherein executing the at least one identified relevancy rule comprises generating relevancy scores for at least one of the identified fields in the relevancy index table monitored data sources, wherein the at least one identified relevancy rule is based on a relative comparison of a number of identified interactions for different fields from the plurality of monitored data sources identified in the relevancy index table within a threshold time period; and
in response to evaluating the relevancy index table, identifying relevant data at the plurality of monitored data sources for a particular data analysis context, wherein the relevant data is associated with a set of fields from the field identified in the relevancy index table, wherein the set of fields have a higher relevancy score compared to a threshold value, wherein the set of fields are identified as relevant for the particular data analysis context.

9. The medium of claim 8, wherein each row in the relevancy index table associated with an identified field includes a timestamp identifying a last accessed time associated with the most recent identified interaction.

10. The medium of claim 8, wherein updating the relevancy index table to include the determined set of data associated with the identified fields includes:

for each identified field:
  determining whether an existing row in the relevancy index table includes an existing set of data associated with the particular identified field;
  in response to determining that an existing row in the relevancy index table is associated with the particular identified field:
    adding the count of the number of interactions associated with the particular field in the determined set of data to the existing set of data associated with the particular identified field; and
    updating the timestamp identifying the last accessed time associated with most recent identified interaction to a last accessed time from the determined set of data associated with the at least one identified interaction.

11. The medium of claim 10, wherein updating the relevancy index table to include the determined set of data associated with the identified fields includes:
  for each identified field:
    in response to determining that no existing row in the relevancy index table is associated with the particular identified field, inserting a new row into the relevancy index table associated with the particular identified field, wherein inserting includes:
      setting the count of the number of interactions associated with the particular field to the count of the number of the at least one identified interactions associated with the particular field in the determined set of data; and
      setting the timestamp identifying the last accessed time associated with most recent identified interaction to a last accessed time from the determined set of data associated with the at least one identified interaction.

12. The medium of claim 8, wherein generating the relevancy score for at least one of the fields in the relevancy index table comprises updating an existing relevancy score for the at least one of the fields in the relevancy index table based on the updates to the relevancy index table after the inclusion of the determined set of data.

13. The medium of claim 8, wherein the at least one identified relevancy rule is configured by an administrator.

14. The medium of claim 8, wherein instructions which, when executed, cause at least one processor to perform operations further comprising:
  identifying at least one relevancy table cleanup rule associated with the relevancy index table, wherein the at least one identified relevancy table cleanup rule defines at least one criteria for removing rows from the relevancy index table;
  determining, for each of the rows in the relevancy index table, whether the at least one criteria for removing rows from the relevancy index table is satisfied; and
  in response to determining that the at least one criteria for removing rows from the relevancy index table is satisfied for a particular row, removing the particular row from the relevancy index table.

15. A system comprising:
at least one hardware processor; and
a memory communicatively coupled to the at least one processor, the memory storing instructions which, when executed, cause the at least one hardware processor to perform operations comprising:
  identifying at least one interaction with at least one of a plurality of monitored data sources, wherein each of the at least one identified interactions is associated with a particular field of a database table associated with the particular one of the monitored data sources;
  determining a set of data associated with the at least one identified interaction, where the determined set of data includes an identification of each field associated with the at least one identified interactions and a count of a number of interactions associated with each particular field;
  updating a relevancy index table to include the determined set of data associated with the identified fields, wherein each identified field is associated with a row in the relevancy index table;
  identifying at least one relevancy rule to be evaluated for the relevancy index table;
  executing the at least one identified relevancy rule on the relevancy index table, wherein executing the at least one identified relevancy rule comprises generating relevancy scores for at least one of the identified fields in the relevancy index table monitored data sources, wherein the at least one identified relevancy rule is based on a relative comparison of a number of identified interactions for different fields from the plurality of monitored data sources identified in the relevancy index table within a threshold time period; and
  in response to evaluating the relevancy index table, identifying relevant data at the plurality of monitored data sources for a particular data analysis context, wherein the relevant data is associated with a set of fields from the field identified in the relevancy index table, wherein the set of fields have a higher relevancy score compared to a threshold value, wherein the set of fields are identified as relevant for the particular data analysis context.

16. The system of claim 15, wherein each row in the relevancy index table associated with an identified field includes a timestamp identifying a last accessed time associated with the most recent identified interaction.

17. The system of claim 16, wherein updating the relevancy index table to include the determined set of data associated with the identified fields includes:
  for each identified field:
    determining whether an existing row in the relevancy index table includes an existing set of data associated with the particular identified field;
    in response to determining that an existing row in the relevancy index table is associated with the particular identified field:
      adding the count of the number of interactions associated with the particular field in the determined set of data to the existing set of data associated with the particular identified field; and
      updating the timestamp identifying the last accessed time associated with most recent identified interaction to a last accessed time from the determined set of data associated with the at least one identified interaction.

18. The system of claim 17, wherein updating the relevancy index table to include the determined set of data associated with the identified fields includes:
  for each identified field:
    in response to determining that no existing row in the relevancy index table is associated with the particular identified field, inserting a new row into the relevancy index table associated with the particular identified field, wherein inserting includes:

setting the count of the number of interactions associated with the particular field to the count of the number of the at least one identified interactions associated with the particular field in the determined set of data; and setting the timestamp identifying the last accessed time associated with most recent identified interaction to a last accessed time from the determined set of data associated with the at least one identified interaction.

\* \* \* \* \*